United States Patent
Kasai et al.

(10) Patent No.: US 6,818,053 B2
(45) Date of Patent: Nov. 16, 2004

(54) PROCESS FOR PRODUCING QUINACRIDONE PIGMENT MICROCRYSTALS

(75) Inventors: Hitoshi Kasai, Miyagi (JP); Hachiro Nakanishi, Miyagi (JP); Kunio Arai, Miyagi (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/380,176

(22) PCT Filed: Nov. 28, 2001

(86) PCT No.: PCT/JP01/10397

§ 371 (c)(1), (2), (4) Date: Mar. 13, 2003

(87) PCT Pub. No.: WO02/092700

PCT Pub. Date: Nov. 21, 2002

(65) Prior Publication Data

US 2003/0183128 A1 Oct. 2, 2003

(30) Foreign Application Priority Data

May 15, 2001 (JP) ........................................ 2001-144706

(51) Int. Cl.[7] .............................................. C09B 67/52
(52) U.S. Cl. .......................... 106/497; 106/495; 546/49; 546/56
(58) Field of Search ................................ 106/495, 497; 546/49, 56

(56) References Cited

U.S. PATENT DOCUMENTS

| 4,368,582 | A | * | 1/1983 | Graser et al. | .................. | 34/405 |
| 4,451,654 | A | * | 5/1984 | Graser et al. | .................. | 546/34 |
| 6,358,308 | B2 | * | 3/2002 | Jung et al. | .................. | 106/493 |
| 6,537,364 | B2 | * | 3/2003 | Dietz et al. | .................. | 106/493 |
| 6,582,508 | B2 | * | 6/2003 | Dietz et al. | .................. | 106/493 |
| 2001/0003959 | A1 | * | 6/2001 | Jung et al. | .................. | 106/493 |

FOREIGN PATENT DOCUMENTS

| EP | 000887390 A1 | * | 12/1998 |
| JP | 2001-172519 | | 6/2001 |
| JP | 2001-262023 | | 9/2001 |

OTHER PUBLICATIONS

Komai, et al., "Preparation of Organic Microcrystals Using Supercritical . . . ", Jpn. J. Appl. Phys. vol. 38 (1999) pp. L81–L83, no month.

Kasai, et al., "Preparation of C60 Microcrystals Using High–Temperature . . . ", The Chemical Society of Japan, Chemistry Letters 2000, pp. 1392–1393, no month.

He, et al., "Electrostatic Self–Assembly of Polydiacetylene Nanocrystals . . . ", J. Phys. Chem. B 1999, 103, pp. 11050–11056, no month.

* cited by examiner

Primary Examiner—Anthony J. Green
(74) Attorney, Agent, or Firm—Sherman & Shalloway

(57) ABSTRACT

The method for preparation quinacridone pigment nanocrystals with sub micrometer to nanometer in average size comprising, supplying supercritical or semi-critical liquid, which dissolves quinacridone pigment, into a specimen tube (ST) composing a reactor possessing a filter of desired opening to the upper stream side and to the down stream side in which quinacridone pigment is set up, flowing out the supercritical or semi-critical liquid in which quinacridone pigment is dissolved from said reactor to a mixing apparatus to which coolant is supplied, and by selecting the kind of supercritical of semi-critical liquid and combination of conditions e.g. supplying speed of each liquids, temperature of the liquid and the reacting pressure.

5 Claims, 3 Drawing Sheets

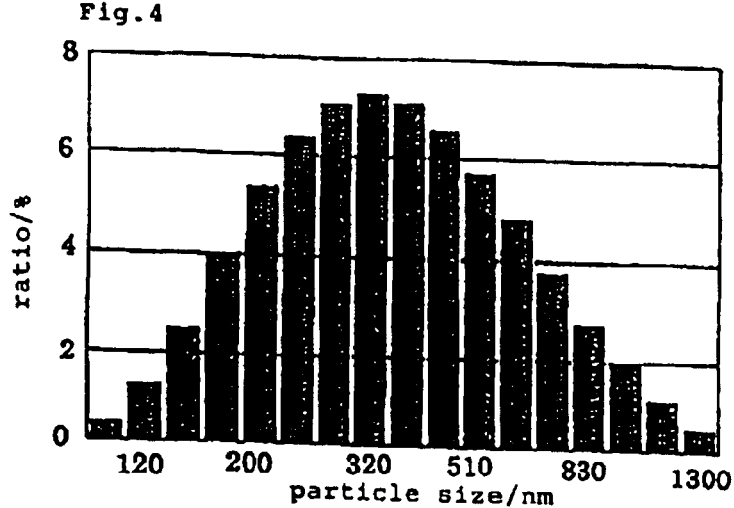

PROCESS FOR PRODUCING QUINACRIDONE PIGMENT MICROCRYSTALS

BACKGROUND OF INVENTION

The present invention relates to a method for preparation of fine crystal of quinacridone pigment by use of high temperature high pressure solution, in particular relates to a method for preparation of fine crystal of quinacridone pigment by means of a reprecipitation method from supercritical or sub-critical liquid. Further, the present invention relates to a method for preparation of fine crystal of quinacridone pigment having adjusted submicron average particle size by following process. Namely, supercritical or sub-critical liquid is provided continuously into a specimen tube composing of a reactor with a filter which prevents the flow out of the material quinacridone pigment, the supercritical or sub-critical liquid of quinacridone pigment is took out by way of said filter to a mixing apparatus in which said liquid is mixed with coolant and is reprecipitated. The preparation of above mentioned fine crystal of quinacridone pigment is carried out by using, for example, a flow type apparatus mentioned in FIG. 1.

The quinacridone pigment, for example, the non-substituted quinacridone pigment or 2,9-dimethyl quinacridone has a good light absorption and has less impulse to skin, namely has high biological security, further, is a stable red pigment to heat and light. Therefore, the quinacridone pigment is used as an excellent coloring agent for a coating, a color filter, a toner for electrophotography, a developer or an ink for jet printing. Further, since the quinacridone pigment has a functional characteristic such as an excellent electro static characteristic or an light-electric characteristic, it is used as an additive for improving the electret characteristic, an EL material or as an electric charge generating layer forming material in organic photo semiconductor material for photosensitive medium of electrophotography.

Still more, the other quinacridone pigment, e.g. 2,9-dimethyl qulnacridone, 2,9-dichloroquinacridone, 2,9-difluoroquinacridone, 2,9-dimethoxyquinacridone or 4,11-dichloroquinacridone can adjust the particle size, color characteristic or electrostatic characteristic of the obtained solid by forming solid solution (or mixed crystal) with non-substituted quinacridone pigment, or 2,9-dimethyl quinacridone, and then can be used as the material to generate the quinacridone pigment whose uses are improved.

The useful characteristics that said organic quinacridone pigment has, such as disparsability, reoligical characteristic, photo characteristic, absorption wave length (coloring ability) or transparency are affected by purity, size of crystalline particle, particle size distribution and shape of the particle, and the functional characteristic is changed. Therefore, it is important to develop the method for crystallization which can adjust the crystal particle according to the desired characteristic.

Usually, for the adjusting of the particle size of quinacridone pigment, the mechanical grinding method by dry condition (sand grind, ball mill) or by wet condition (salt-kneading), and the method by solvent treatment, for example, the method to heat with solvent (under the presence of water or additives such as dispersing agent or surface active agent) are proposed.

Further, the technique to adjust the particle size of quinacridone pigment by contriving the manufacturing process of said pigment is also proposed. For example, the technique by finding out the particle growth controlling molecule which is especially effective for the growth of pigment particle and/or for the controlling and adjusting of crystal modification and by making coexist said molecule in the process to manufacture the quinacridone pigment is reported UP Laid-open publication 2000-226530, published on Aug. 15, 2000). Said technique is illustrated as follows, namely, the particle growth controlling molecule is absorbed to the synthesized pigment molecule and accordingly controls the growth of crystal and crystalline phase. And it is illustrated that, by this technique, the growth of crystal can be controlled by generating a desired crystalline phase shape, for example, fine plate crystal, needle crystal, cubic crystal, small leaf form crystal, prism crystal, fibrous crystal or other geometric shape.

As mentioned above, because of the usefulness of quinacridone and derivatives thereof, the quinacridone and derivatives thereof are not only used for approximately 50% of all red pigments, but also is promisingly used for EL materials. However, the conventional technique to adjust the particle size of crystal of quinacridone pigment can not be said sufficient as the technique for the preparation of fine particle of quinacridone pigment with desirable characteristic, further linked to the development of the novel function. Further, because the quinacridone pigment is an insoluble compound, it is very difficult to find out the solvent which can be used effectively to the preparation of crystal by means of re-crystallization (re-precipitation), and the refinement and the crystallizing of it are not so easy.

The object of the present invention is to provide a method for preparation of quinacridone pigment by which the refining and the crystallization of quinacridone pigment can be can easily carried out under the regulated condition.

The inventors of the present invention are proposing the technique relating to a method for preparation of organic fine crystals such as titanilphthalocyanine (TiOPc), one of polydiacetylene: 1,6-dicarbazoil-2,4-hexadlyne (Document 1), $C_{60}$ (Document 2) and so on using supercritical liquid, further, are proposing the technique relating to a method for preparation of regulated fine crystal which can be used as nonlinear optical materials and switching materials (Document 3).

During an earnest study to dissolve the problems for refining and nanocrystallizing of above mentioned quinacridone pigment, the inventors of the present invention have tried to prepare the fine particle of quinacridone pigment using supercritical or sub-critical liquid. And the inventors of the present invention have found that by arranging the starting material for quinacridone pigment into a vessel in which the supercritical or sub-critical liquid flows, and by using an apparatus for supercritical re-precipitation which allows the flow of the supercritical or sub-critical liquid, the quinacridone pigment is refined as the first step, then, the fine crystal of quinacridone pigment whose particle size is adjusted can be simply and easily prepared in the state of water dispersion. And the problems of the present invention can be dissolved. That is, by altering the preparing condition such as kinds of supercritical or sub-critical liquid, supplying speed of the liquid, temperature of the liquid or pressure, it becomes possible to adjust the size (average particle size) of generated fine crystal particle within the range of particle size smaller than 500 nm, further within the range of particle size smaller than 300 nm. The phenomenon that the photo absorption characteristics are changeable along with the minimization of the particle size, is confirmed in the case of this quinacridone pigment too.

SUMMARY OF INVENTION

The present invention is the method for preparation of sub micron to nano size fine crystal of quinacridone pigment whose average particle size is regulated comprising, supplying supercritical or sub-critical liquid, which can dissolve quinacridone pigment, into a reactor containing quinacridone pigment, flowing out the supercritical or sub-critical liquid in which quinacridone pigment is dissolved from said reactor to a mixing apparatus to which coolant is supplied, and by selecting the kind of supercritical or sub-critical liquid and by selecting the combination of supplying speed of each liquids, temperature of the liquid and the reacting pressure. Desirably, the present invention is the method for preparation of said fine crystal of quinacridone pigment, wherein the reactor containing quinacridone pigment possesses a filter of 0.5 μm to 20 μm diameter to the upper stream side and to the down stream side. More desirably, the present invention is the method for preparation of fine crystal of quinacridone pigment whose average particle size is smaller than 300 nm, wherein the supercritical liquid at least one liquid selected from the group consisting of water, alcohol and ketone. Furthermore desirably, the present invention is the method for preparation of fine crystal of quinacridone pigment whose average particle size is smaller than 300 nm, wherein the coolant is at least one liquid selected from the group consisting of water, alcohol and ketone, the temperature of the coolant is adjusted to the range from −100° C. to 50° C. and the coolant is mixed with the supercritical liquid so as the volume ratio of supercritical liquid/coolant to be within the range from 1:1to 1:10. Still further desirably, the present invention is the method for preparation of fine crystal of quinacridone pigment whose average particle size is smaller than 300 nm of claim 4, wherein the supercritical liquid is water and the temperature of the supercritical liquid is from 270° C. to 320° C.

BRIEF DESCRIPTION OF DRAWINGS

FIG. 4 shows the measuring results of size distribution of fine particles calculated from the diffusion constant of correlation function by DLS method measured on the water dispersion of non-substituted quinacridone pigment prepared under the condition of 23.5 Mpa pressure and the 368° C. temperature, which is over 318° C. and in the semi-critical state.

DETAILED DESCRIPTION

The present invention will be illustrated more in detail in accordance to the following description.

A. One example showing the apparatus for preparation of the fine crystal of quinacridone pigment of the present invention according to the supercritical re-precipitation method is shown in FIG. 1.

Figure 1:
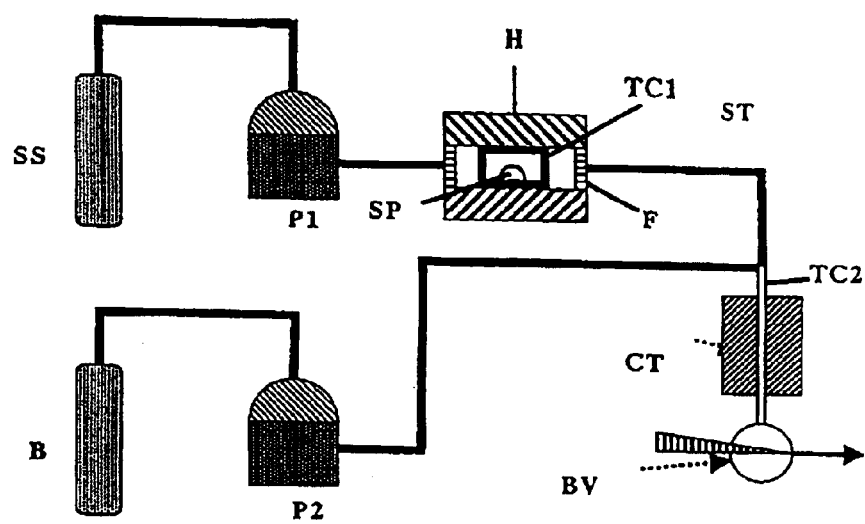
FIG. 1 is the one example showing the method for preparation of the fine crystal of quinacridone pigment of present invention according to the supercritical re-precipitation method.

The process for preparation method of fine particles of quinacridone pigment using supercritical liquid is illustrated referring to FIG. 1.

As the first step:

1. The specimen of quinacridone pigment (SP) is set up to the specimen tube (ST) composing a reactor. To the front position and the rear position of the specimen tube (ST), a desired opening, for example, a filter of 0.5 μm to 20 μm diameter (F) is arranged.

2. The supercritical solvent (SS) and the cooling (B) is supplied by regulating the pressure of pumps (P1, P2) and a back pressure valve (BV) so as to regulate the reacting pressure and flow rate. For example, the supplying speeds of both liquids are settled to 5 mL/minute flow rate, and water is flown as a liquid. And, the pressure of the reactor is adjusted to 23.5 Mpa by closing a back pressure valve (BV) (incidentally, the critical pressure of water is 22.04 Mpa).

3. The specimen tube (ST) is heated by a heater (H) and the temperature in the reactor is monitored by a thermo coupling (TCI) (incidentally, the critical temperature of water is 374.1° C.).

4. The solution of quinacridone pigment which passed a filter (F) from a test tube is mixed with a coolant and cooled down, and the fine crystal of quinacridone pigment having adjusted particle size corresponding to the regulated preparation condition.

In the case when water is used as a supercritical solution, non-colored transparent water flows out at the lower temperature than approximately 200° C., yellowish liquid flows out at the temperature from 200° C. to 270° C., and the color of flown out liquid becomes red when the temperature exceeds 270° C., and the generation of water dispersion of fine crystal of quinacridone is confirmed. Further, at the temperature exceeding 371° C., the eluting concentration becomes high.

B. As the liquid to be used as a super critical liquid and a coolant following liquids can be used. That is, as the inorganic liquid, water or carbon dioxide can be mentioned and as the organic liquid, alcohols such as methanol, ketones such as acetone or the mixture thereof can be mentioned.

The liquid to be used as the super critical liquid or the coolant can be same or can be different.

By regulating the supplying ratio of the super critical liquid and the coolant, the cooling condition can be adjusted.

As the means to heat the super critical liquid, a pre-heater (not indicated by drawing) can be used. And for cooling, the mixing with a coolant and the external cooling means can be used together with.

C. The pressure can be adjusted by regulating the supplement pressure of pumps (pump P1 and pump P2) and back pressure valve (BV).

Since a super critical liquid can be activated according to the kind of liquid to be used, it is desirable that the contacting part to the super critical liquid is consisted of metal or ceramic whose activity is improved.

EXAMPLES

The present invention will be illustrated more in detail in accordance with the following Examples, however, these Examples is to clarify the applicability of the present invention and not intending to limit the scope of the present invention.

Example 1

Preparation of the Dispersion of Quinacridone Pigment Fine Crystal

Figure 2:
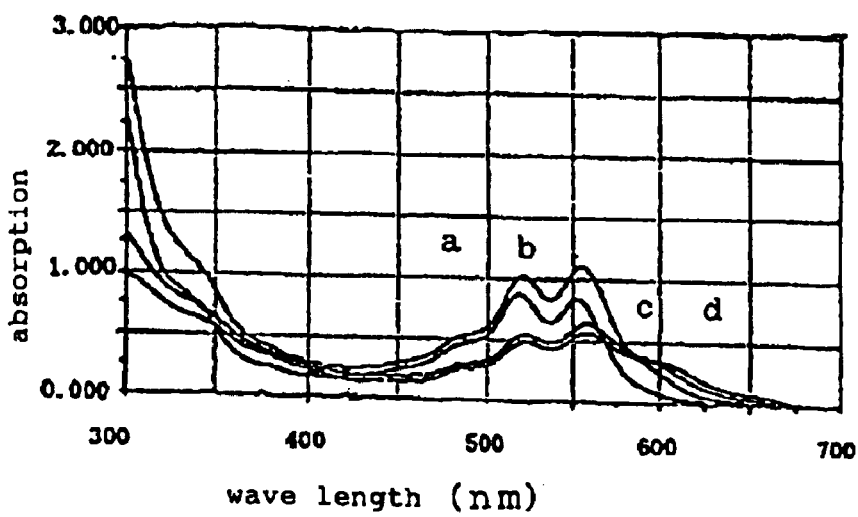
FIG. 2 is the absorption spectrum of the water dispersion of fine crystal of non-substituted quinacridone pigment prepared by setting the temperature of a specimen tube ST composing a reactor to 276° C.(a), 318° C. (b), 371° C.(c) and 385° C.(d).

The absorption spectrums of the water dispersion of fine crystal of non-substituted quinacridone pigment prepared by setting the temperature of a specimen tube (ST) composing a reactor to 276° C.(a), 318° C.(b), 371° C.(c) and 385° C.(d) are shown in FIG. 2.

1. The absorption peak position of said fine crystal of non-substituted linear quinacridone pigment prepared by lower temperature is shifted to a short wave length side, and that of non-substituted linear quinacridone pigment prepared by higher temperature shifts to long wave length side by 10 nm compared with that of lower temperature (peak shifts to shorter wave length side as the particle size becomes smaller).

2. When the preparation temperature is higher, the concentration of the prepared water dispersion of fine crystal of the pigment becomes thicker. And, when the state becomes supercritical or sub-critical, the temperature elevates radically, the dispersion stability deteriorates and coagulates (self-organized) by several minutes. The stability of water dispersions of fine crystal of pigment prepared at 276° C.(a) and 318° C.(b) are very good. This stability is correlated with the crystal size, and because the crystal size of these cases are small, the dispersion stability is improved. And this point is the remarkable effect of the method for preparation of the fine particle dispersion of the present invention.

Figure 3:
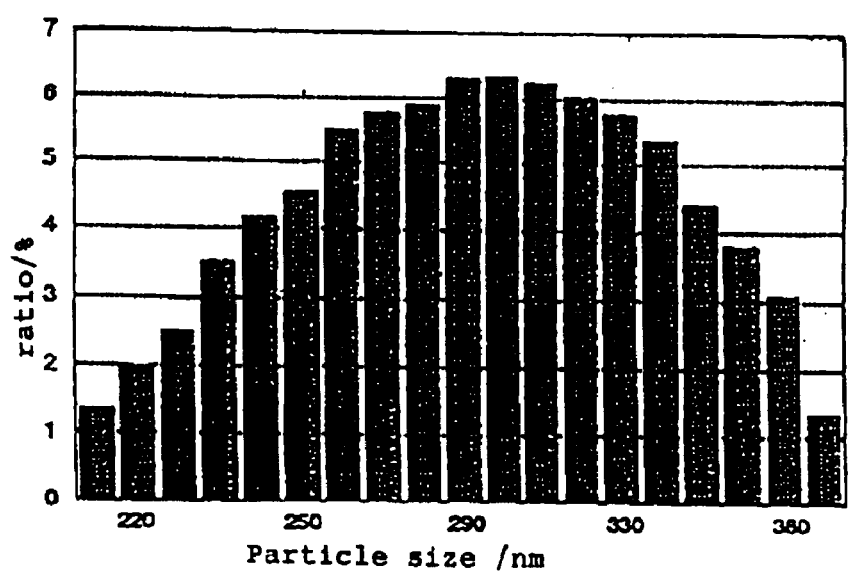
FIG. 3 shows the measuring results of size distribution of fine particles calculated from the diffusion constant of correlation function by the dynamic light scattering method (DLS) measured on the water dispersion of non-substituted quinacridone pigment prepared under the condition of 23.5 Mpa pressure and 318° C. temperature.

At the above mentioned pressure, the size distribution of fine particles calculated from the diffusion constant of correlation function at the dynamic light scattering method (DLS) measured on the water dispersion of quinacridone pigment prepared at the temperature of 318° C. and at the temperature of 368° C. temperature, which is over 318° C. are shown in FIG. 3 and FIG. 4.

1. It can be understood that the size of quinacridone pigment prepared at the lower temperature is smaller and stable than that of quinacridone pigment prepared at the temperature of 368° C., which is over than 318° C.

2. Regarding the fine crystal size by cumulant expansion method, quinacridone pigment fine crystal prepared at the temperature of 276° C. is calculated as 180 nm, quinacridone pigment fine crystal prepared at the temperature of 318° C. is calculated as 228 nm and quinacridone pigment fine crystal prepared at the temperature 318 to 368° C. is calculated as 309 nm. From these results, it becomes clear that the size of quinacridone pigment fine crystal can be adjusted by the temperature for preparation.

It can be understand that the quinacridone nanocrystals with smaller size can be obtained by the preparation process at lower temperature.

Example 2

Preparation of the Dispersion of 2,9-dimethylquinacridone Pigment Fine Crystal An apparatus characterizing that a filter of 10 μm diameter is set to the front position and the rear position of the specimen tube (ST) composing a reactor is used as the apparatus for preparation of the dispersion of said pigment fine crystal. Balk of 1,9-dimethylquinacridone pigment is poured into the specimen tube. Water is used as the super critical liquid and as the coolant. The flow rate is adjusted to 5 ml/minute. The inner pressure of the preparation apparatus is maintained at approximately 24 MPa by regulating a back pressure valve.

At the beginning of the heating, the flowing out of yellowish liquid is observed, and at the temperature of 290° C., the color of liquid turned to light red color. During the temperature limit from 290° C. to 340° C., the specimens of fine particle of pigment are collected by temperature elevation of every 10° C.

The collected specimens are evaluated by
1; a scanning electronic microscope (SEM),
2; an ultraviolet-visual light absorption (UV-VL) and
3; an X-ray diffraction (XRD).

Observation by a Scanning Electronic Microscope (SEM);

The bulk crystal is the oval shaped particle of 200 nm×50 nm particle size, and the shape of fine crystal obtained by super critical solution crystallization method has spherical shape. The particle size of the fine particle obtained by said method is approximately 30 nm. The size of generated fine particle is not effected by the change of the temperature.

In this case, the temperature does not effect the shape and size of the fine crystal to be generated. When the pressure of the system is reduced, the shape of fine crystal is changed and the fine crystal of rod shape is generated.

The size of spherical shape fine particle becomes larger along with the pressure increase, and approximately 60 nm.

Evaluation by UV-VL Spectrum;

The absorption peak position of bulk crystal is observed at 540 nm. In the case of fine crystal pigment obtained as above, it is found that the peak position shifts to the high energy side. This behavior can be understood as to be caused by the size effect of fine crystal. When the treating temperature is elevated, said absorption peak is slightly shifted to the low energy side. That is, the absorption peak of the specimen obtained at 290° C. is 530.5 nm and that of obtained at 330° C. is 533 nm.

Observation by XRD;

The diffraction pattern of 2θ=20.0–30.0 is remarkably different from that of bulk crystal, therefore, it is understood that the crystal pattern of generated fine crystal is different from that of balk crystal.

Non-substituted quinacridone pigment and 2,9-dimethyl quinacridone pigment are illustrated. This illustration can be applied to other 2,9-dimethyiquinacridone pigment, for example, 2,9-dichloro quinacridone, 2,9-difluoroquinacridone and 2,9-dimethoxyquinacridone, further, can be applied to other quinacridone derivatives such as 4,11-dichloro quinacridone. Still more, this method can be applied to the preparation of solid solution (or mixed crystal).

Documents;

Document 1: Yuko KOMAI, Hitoshi KASAI et al., Jpn. J.Appl.Phys, 38, L81–L83 (1999)

Document 2: Hitoshi KASAI et al., Chemistry Letters 2000, 1392–1394 (2000)

Document 3: Jin-An HE et al., J.Phys.Chem.B, 103(50), 11050–11056 (1999)

INDUSTRIAL APPLICABILITY

As mentioned above, by the method of the present invention which prepare the fine crystal of quinacridone pigment, the fine crystal of quinacridone pigment having excellent dispersion stability can be obtained. And by this method, not only the improvement of the conventional characteristics which said quinacridone pigment has but also the novel function can be obtained.

What is claimed is:

1. The method for preparation of quinacridone pigment nanocrystals with sub micrometer to nanometer in average size comprising, supplying supercritical or sub-critical liquid, which can dissolve quinacridone pigment, into a reactor containing quinacridone pigment, flowing out the supercritical or sub-critical liquid in which quinacridone pigment is dissolved from said reactor to a mixing apparatus to which coolant is supplied, and by selecting the kind of supercritical or sub-critical liquid and by selecting the combination of supplying speed of each liquids, temperature of the liquid and the reacting pressure.

2. The method for preparation of fine crystal of quinacridone pigment of claim 1, wherein the reactor containing quinacridone pigment possesses a filter of 0.5 $\mu$m to 20 $\mu$m diameter to the upper stream side and to the down stream side.

3. The method for preparation of fine crystal of quinacridone pigment of claim 2, wherein the average particle size of said quinacridone pigment is smaller than 300 nm, and wherein the supercritical liquid is at least one liquid selected from the group consisting of water, alcohol and ketone.

4. The method for preparation of fine crystal of quinacridone pigment whose average particle size is smaller than 300 nm of claim 3, wherein the coolant is at least one liquid selected from the group consisting of water, alcohol and ketone, the temperature of the coolant is adjusted to the range from $-100°$ C. to $50°$ C. and the coolant is mixed with the supercritical liquid so as the volume ratio of supercritical liquid/coolant to be within the range from 1:1 to 1:10.

5. The method for preparation of fine crystal of quinacridone pigment whose average particle size is smaller than 300 nm of claim 4, wherein the supercritical liquid is water and the temperature of the supercritical liquid is from $270°$ C. to $320°$ C.

* * * * *